J. G. CALLAN.
MEANS FOR PREVENTING BACKWARD ROTATION OF TWO-CYCLE ENGINES.
APPLICATION FILED JULY 29, 1907.
949,994. Patented Feb. 22, 1910.
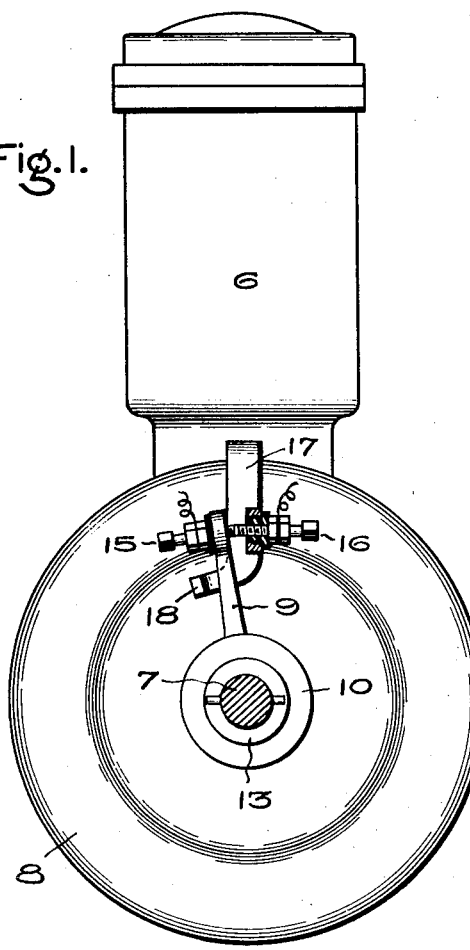
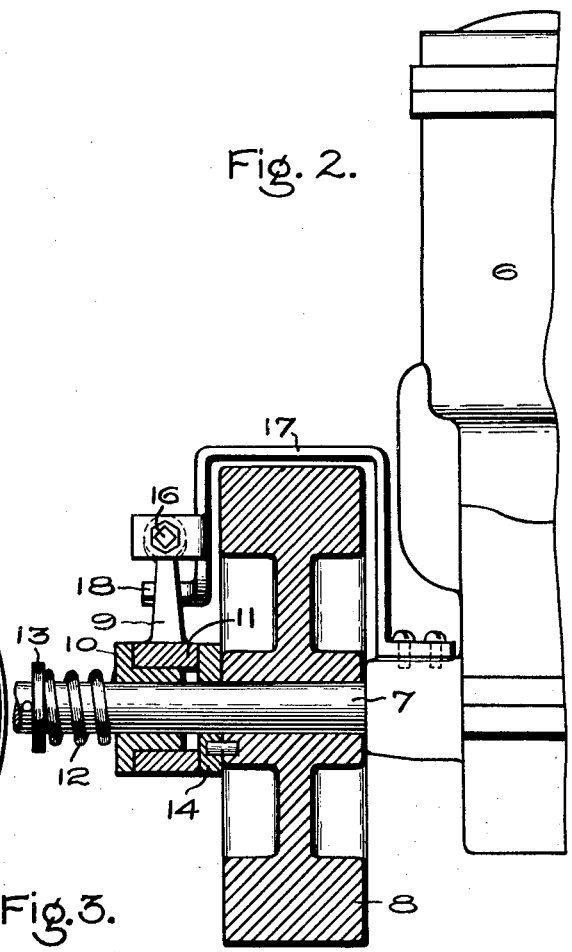
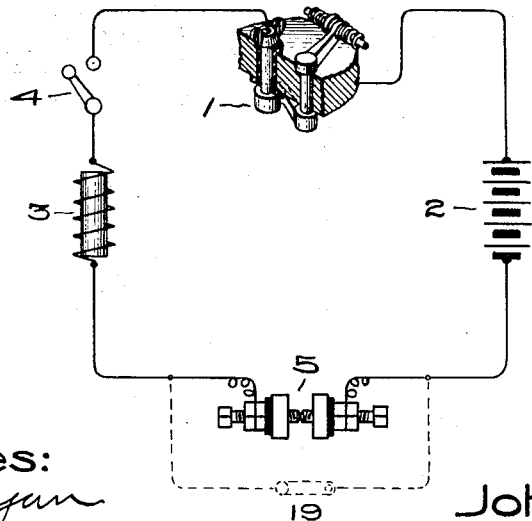
Witnesses:
J. Earl Ryan
J. Ellis Glen
Inventor
John G. Callan,
By Albert G. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

MEANS FOR PREVENTING BACKWARD ROTATION OF TWO-CYCLE ENGINES.

949,994. Specification of Letters Patent. Patented Feb. 22, 1910.

Application filed July 29, 1907. Serial No. 385,949.

*To all whom it may concern:*

Be it known that I, JOHN G. CALLAN, a citizen of the United States, residing at Lynn, in the county of Essex and State of Massachusetts, have invented certain new and useful Improvements in Means for Preventing Backward Rotation of Two-Cycle Engines, of which the following is a specification.

This invention relates to internal combustion engines of the two-cycle type and its object is to prevent such engines from rotating continuously in a backward direction when such operation is not desired.

When a two-cycle engine is being started, or when it is running slowly, it can be easily reversed by advancing the spark a trifle, so that ignition takes place just before the crank arrives at the upper dead center. Since these engines have no cam-actuated valves, they will run equally well in either direction, and if rotation begins in the wrong direction the engine may make a good many revolutions before it can be slowed down and stopped. My invention aims to obviate this annoyance by automatically opening the ignition circuit the instant backward rotation commences.

In the accompanying drawing, Figure 1 is an end elevation of a two-cycle engine embodying my invention; Fig. 2 is a sectional side elevation; and Fig. 3 is a diagram of circuits.

Referring first to Fig. 3, let 1 represent the sparker of a two-cycle internal combustion engine, supplied with current from a battery 2 through a self-induction coil 3 and switch 4. At some point in the circuit I interpose a circuit-breaker or cut-out 5, and provide means for automatically opening said cut-out when the engine starts backward. The devices I prefer to use for this purpose are shown in Figs. 1 and 2, wherein 6 represents the cylinder of the engine, 7 the crank-shaft and 8 the fly-wheel. A rotatable member is arranged in frictional engagement with the shaft 7 or some shaft driven thereby. I prefer for this purpose the arm 9 mounted on the shaft, preferably adjacent to the hub of the fly-wheel. The arm is free to revolve on the shaft, but is maintained in frictional engagement therewith in some suitable manner so as to tend to rotate with the shaft. This result may be readily accomplished by means of a collar or flanged sleeve 10 slidable on the shaft and urged against the hub 11 of the arm 9 by a spring 12 arranged between said sleeve and a collar 13 fixed on the shaft. The hub 11 abuts against the hub of the fly-wheel or against a washer 14 secured thereto so that the frictional engagement between the hub 11 and the hub or washer on the fly-wheel causes the arm to rotate with the shaft. The fly-wheel hub or the washer thus forms an abutment against which the hub 11 is held in frictional contact by the parts 10, 12 and 13. Some other abutment fixed to the shaft might be employed, if desired, but the arrangement shown is compact and avoids multiplication of parts.

The outer end of the arm carries an insulated contact-screw 15 which stands in coöperative relation to a stationary contact screw 16, similarly insulated from its support, which is preferably a bracket 17 attached to the frame of the engine. Suitable means are provided to limit the angular movements of the arm within a predetermined range; preferably a stop-lug 18 located a little distance behind the arm 9. The contact screws are in circuit with the sparker, forming the switch or cut-out 5 of Fig. 3.

The operation of the invention is as follows: Forward rotation of the engine is in the direction of the arrow, Fig. 1. The frictional engagement of the arm with the shaft keeps the two contact-screws pressed together, and the ignition circuit is thereby kept closed. The instant, however, that the shaft begins to rotate backward, the arm 9 is swung back against the stop-lug, separating the contact-screws and opening the circuit. This makes it impossible for more than one reverse explosion to occur, so that the engine cannot rotate continuously in the wrong direction.

If it is desired for any reason to prevent the opening of the ignition circuit, it can be accomplished by means of an auxiliary switch 19 shunted around the automatic cut-out and kept normally open. This will be closed temporarily when desired, as for instance when starting the engine by rocking the fly-wheel instead of using the starting-crank.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent, is,

1. The combination with a two-cycle engine having a sparking device, of a shaft driven by the engine, a source of electricity in circuit with said device, means rotatably mounted on the shaft for keeping said circuit closed while the engine is rotating in a given direction and for automatically opening the circuit on the reversal of the rotation.

2. The combination with a two-cycle engine having a sparking device, of a shaft driven by the engine, a source of electricity in circuit with said device, a cut-out in said circuit, and means rotatably mounted on said shaft for keeping the cut-out closed while the engine is rotating in a given direction and for automatically opening said cut-out upon a reversal of the rotation.

3. The combination with a two-cycle engine having a sparking device and a shaft, of a source of electricity in circuit with said device, a cut-out in said circuit, and an arm rotatably mounted on the engine shaft by which the cut-out is opened when the shaft rotates in a given direction and is kept closed while it is rotating in the opposite direction.

4. The combination with a two-cycle engine, of a rotatable member on the engine shaft, means for confining its range of rotation within predetermined limits, an abutment on the shaft, means causing frictional engagement between the member and the abutment, and contacts in the ignition circuit adapted to be opened and closed by the movements of said member.

5. The combination with a two-cycle engine, of an arm rotatably mounted on the engine shaft, an abutment on the shaft adjacent the arm, means mounted on the shaft for maintaining the arm in frictional engagement with the abutment, and contacts in the ignition circuit controlled by said arm.

6. The combination with a two-cycle engine, of an arm rotatably mounted on the engine shaft, an abutment on the shaft adjacent the arm, means pressing the arm along the shaft into frictional engagement with the abutment, a contact on the arm, and a stationary contact in coöperative relation thereto, said contacts being included in the ignition circuit.

7. The combination with a two-cycle engine having a shaft, of an arm rotatably mounted on the engine shaft adjacent to the fly-wheel hub, a spring urging said arm against said hub, an insulated contact-screw carried by said arm, a bracket attached to the engine frame, an insulated contact-screw carried by said bracket, and a stop lug on said bracket for limiting the movement of the arm, said contact-screws being included in the ignition circuit.

8. The combination in an internal combustion engine having a shaft and a sparking device, of a source of electricity in circuit with said device, and means for closing the circuit while the engine is rotating in a given direction and for automatically opening the circuit on the reversal of the rotation, said means including a member rotatably mounted on the shaft and a frictional driving connection between the shaft and said member.

In witness whereof, I have hereunto set my hand this 26th day of July, 1907.

JOHN G. CALLAN.

Witnesses:
JOHN A. McMANUS, Jr.,
WILLIAM G. FISHER.